United States Patent
Debong et al.

(10) Patent No.: US 12,433,996 B2
(45) Date of Patent: Oct. 7, 2025

(54) SYSTEM AND METHOD FOR DETECTING ISSUES IN THE BASAL RATE IN INSULIN TREATED DIABETES PATIENTS

(71) Applicant: mySugr GmbH, Vienna (AT)

(72) Inventors: Fredrik Debong, Vienna (AT); Lukas Schuster, Vienna (AT); Jan Wrede, Salzgitter-Bad (DE); Rafael Bankosegger, Vienna (AT)

(73) Assignee: mySugr GmbH, Vienna (AT)

( * ) Notice: Subject to any disclaimer, the term of this patent is extended or adjusted under 35 U.S.C. 154(b) by 736 days.

(21) Appl. No.: 17/149,398

(22) Filed: Jan. 14, 2021

(65) Prior Publication Data

US 2021/0128833 A1 May 6, 2021

Related U.S. Application Data

(63) Continuation of application No. PCT/EP2019/069018, filed on Jul. 15, 2019.

(30) Foreign Application Priority Data

Jul. 15, 2018 (EP) .................. 18183576

(51) Int. Cl.
*A61M 5/172* (2006.01)
*A61M 5/142* (2006.01)
*A61M 5/168* (2006.01)

(52) U.S. Cl.
CPC .......... *A61M 5/1723* (2013.01); *A61M 5/142* (2013.01); *A61M 5/16877* (2013.01); *A61M 2205/52* (2013.01); *A61M 2205/583* (2013.01)

(58) Field of Classification Search
CPC ............ A61M 2205/52; A61M 5/1723; A61M 5/16877
See application file for complete search history.

(56) References Cited

U.S. PATENT DOCUMENTS

2009/0253973 A1* 10/2009 Bashan ................. G16H 10/00
604/67
2010/0256458 A1* 10/2010 Yodfat ................... G16H 20/10
600/300

(Continued)

FOREIGN PATENT DOCUMENTS

WO    WO 2008/112078 A2    9/2008

OTHER PUBLICATIONS

International Search Report and Written Opinion of the International Searching Authority, PCT/EP2019/069018, Oct. 14, 2019, 10 pages.

*Primary Examiner* — Courtney B Fredrickson
*Assistant Examiner* — Kayla M. Turkowski
(74) *Attorney, Agent, or Firm* — Bose McKinney & Evans LLP

(57) ABSTRACT

A system for determining a deficiency in an infusion rate for a user has a processor, a display, a memory and, optionally, one or more of a pump and an analyte monitor. The processor receives measured glucose values that each have a timestamp indicating the time/date of measurement. The processor determines whether the glucose values include n pairs of glucose values $g0_{1\ to\ n}$ and $g1_{to\ n}$, where each pair of glucose values fulfils a predefined set of criteria obtained from the memory. Pairing values are determined based on the glucose values $g0_x$ and $g1_x$. The pairing values are compared to threshold values obtained from the memory. Exceeding or falling below the threshold values indicates a deficiency of the basal insulin rate of the patient.

11 Claims, 3 Drawing Sheets

(56) References Cited

U.S. PATENT DOCUMENTS

| | | |
|---|---|---|
| 2012/0232486 A1 | 9/2012 | Blomquist |
| 2013/0338630 A1 | 12/2013 | Agrawal et al. |
| 2014/0350369 A1* | 11/2014 | Budiman ............... A61B 5/742 |
| | | 702/19 |
| 2015/0134356 A1 | 5/2015 | Atlas et al. |
| 2018/0199867 A1* | 7/2018 | Chang .................... G16H 50/20 |
| 2021/0268185 A1* | 9/2021 | Blanc ..................... G16H 20/17 |

* cited by examiner

SYSTEM AND METHOD FOR DETECTING ISSUES IN THE BASAL RATE IN INSULIN TREATED DIABETES PATIENTS

RELATED APPLICATIONS

This application is a continuation of PCT/EP2019/069018, filed Jul. 15, 2019, which claims priority to EP 18 183 576.0, filed Jul. 15, 2018, the entire disclosures of both of which are hereby incorporated herein by reference.

BACKGROUND

This disclosure relates to a computer-implemented method, a computer program product, and a system for determining a potential deficiency in the basal insulin rate of a diabetes patient.

Diabetes is a disease in which the body's ability to produce or respond to the hormone insulin is impaired, resulting in abnormal metabolism of carbohydrates and elevated levels of glucose in the blood. Symptoms of high blood sugar include frequent urination, increased thirst, and increased hunger. If left untreated, diabetes can cause many complications. Acute complications can include diabetic ketoacidosis, hyperosmolar hyperglycemic state, or death. Serious long-term complications include cardiovascular disease, stroke, chronic kidney disease, foot ulcers, and damage to the eyes.

Insulin therapy is often an important part of diabetes treatment and can prevent diabetes complications by helping to keep the blood sugar within a target range. Mimicking the normal physiologic pattern of insulin secretion may be an optimal way to achieve tight blood glucose control. The key features of the physiologic pattern of insulin secretion by β (beta) cells are a meal-stimulated peak in insulin secretion that slowly decays over 2 to 3 hours and a sustained basal level that remains constant throughout the day. These actions of insulin maintain plasma glucose levels within a fairly narrow range.

A basal-bolus insulin treatment routine involves taking a longer acting form of insulin to keep blood glucose levels stable through periods of fasting and separate injections of shorter acting insulin to prevent increase in blood glucose levels resulting from meals. The role of basal insulin, also known as background insulin, is to keep blood glucose levels at consistent levels during periods of fasting.

Appropriate basal rates vary from person to person, and may change for a person over time. Due to non-optimized basal rates, the user often ends with high or low glucose readings in the morning, strongly associated with increased HbA1c and diabetes related complications.

Basal rate testing can help figure out if adjustments to the basal rate need to take place. However, conventional basal rate testing as described in the literature requires strong involvement of the patient, and has to be repeated a few times to make sure the results are accurate.

Guidelines of the Alberta Health Services for testing overnight basal rates, e.g., suggest to start the basal test if it has been at least 4 hours since the last food or insulin bolus. Then blood glucose should be checked and recorded before going to bed. The patient is further instructed not to eat a snack or give a bolus. The test should be stopped if glucose is below 4 mmol/l or above 14 mmol/l. In this case, the patient should treat with glucose or give a correction bolus, respectively. Further, the patient is instructed to measure glucose every 3 hours or more during the night. Whenever glucose is below 4 mmol/l or above 14 mmol/l, the test should be stopped and the patient should treat himself with glucose or insulin, respectively. Testing should be done for 2-5 nights until a pattern is seen (does not need to be 5 nights in a row). Blood glucose values should always be recorded. For adjusting the basal rate, the recorded data should be reviewed and the patient should look for patterns. If blood glucose changes more than 2 mmol/l, a basal rate adjustment is needed.

WO 2008/112078 describes patient insulin management devices for managing insulin therapy. The apparatus comprises a user interface configured to generate an electrical signal to start a basal insulin rate test when prompted by a user. User instructions for the basal insulin rate test can be displayed including periodically prompting the user to enter a blood glucose value. If the blood glucose data received during the basal rate test indicates that the blood glucose level of the patient is outside a specified range of blood glucose levels, the controller may cancel the basal insulin rate test.

While the described patient insulin management devices may bring some alleviation to the patient, the user is still required to actively start the basal rate test and is bothered through conducting the test, might not know what he is supposed to do or when the test is aborted he might become frustrated.

SUMMARY

The present disclosure provides improved technology for basal rate testing, in particular for determining a potential deficiency in the present basal insulin rate.

In one aspect, this disclosure relates to a computer-implemented method for determining a deficiency in the basal insulin rate of a diabetes patient in a data processing system having a processor and a memory storing a program causing the processor to execute a method comprising the steps of:

a) receiving a plurality of measured glucose values wherein each glucose value is associated with a measurement timestamp indicating the respective time and date of measurement;

b) optionally receiving meal and/or bolus event information wherein each of the event information is associated with an event timestamp indicating the respective time and date of a meal and/or bolus event;

c) determining whether the plurality of glucose values comprises at least n pairs of glucose values $g0_{1\ to\ n}$ and $g1_{1\ to\ n}$, each pair fulfilling a predefined set of criteria;

d) determining pairing values based on the glucose values $g0_x$ and $g1_x$ of each pair x of the at least n pairs of glucose values and optionally determining one or more statistical values based thereon; and e) comparing the pairing values or the one or more statistical values to respective one or more threshold values obtained from the memory, wherein an exceedance of or falling below one or more of the respective threshold values indicates a deficiency of the basal insulin rate of the diabetes patient.

In another aspect, this disclosure relates to a computer program product, preferably stored on a storage medium, configured to perform the method comprising the steps of:

a) receiving a plurality of measured glucose values wherein each glucose value is associated with a measurement timestamp indicating the respective time and date of measurement;

b) optionally receiving meal and/or bolus event information wherein each of the event information is associated with an event timestamp indicating the respective time and date of a meal and/or bolus event;
c) determining whether the plurality of glucose values comprises at least n pairs of glucose values $g0_{1\ to\ n}$ and $g1_{1\ to\ n}$, each pair fulfilling a predefined set of criteria;
d) determining pairing values based on the glucose values $g0_x$ and $g1_x$ of each pair x of the at least n pairs of glucose values and optionally determining one or more statistical values based thereon; and
e) comparing the pairing values or the one or more statistical values to respective one or more threshold values obtained from the memory, wherein an exceedance of or falling below one or more of the respective threshold values indicates a deficiency of the basal insulin rate of the diabetes patient.

In another aspect, this disclosure relates to a system for determining a deficiency in the basal insulin rate of a diabetes patient comprising a processor, a display and a memory storing a program causing the processor to execute a method comprising the steps of:
a) receiving by the processor a plurality of measured glucose values wherein each glucose value is associated with a measurement timestamp indicating the respective time and date of measurement;
b) optionally receiving by the processor meal and/or bolus event information wherein each of the event information is associated with an event timestamp indicating the respective time and date of a meal and/or bolus event;
c) determining by the processor whether the plurality of glucose values comprises at least n pairs of glucose values $g0_{1\ to\ n}$ and $g1_{1\ to\ n}$, each pair of glucose values fulfilling a predefined set of criteria;
d) determining by the processor pairing values based on the glucose values $g0_x$ and $g1_x$ of each pair x of the at least n pairs of glucose values and optionally determining by the processor one or more statistical values based thereon; and
e) comparing by the processor the pairing values or the one or more statistical values to respective one or more threshold values obtained from the memory, wherein an exceedance of or falling below one or more of the respective threshold values indicates a deficiency of in the basal insulin rate of the diabetes patient.

A message to the patient with information regarding the deficiency in the basal insulin rate of the diabetes patient if an exceedance of or falling below one or more of the respective threshold values is detected in step e) can be automatically output on the display or be electronically sent to the patient.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which a solely and exclusively consists of B) and to a situation in which, besides B, one or more further elements are present in entity A, such as element C, elements C and D or even further elements.

As set out above, in a first embodiment this disclosure relates to a computer-implemented method for determining a deficiency in the basal insulin rate of a diabetes patient in a data processing system having a processor and a memory storing a program causing the processor to execute a method comprising the steps of:
a) receiving a plurality of measured glucose values wherein each glucose value is associated with a measurement timestamp indicating the respective time and date of measurement;
b) optionally receiving meal and/or bolus event information wherein each of the event information is associated with an event timestamp indicating the respective time and date of a meal and/or bolus event;
c) determining whether the plurality of glucose values comprises at least n pairs of glucose values $g0_{1\ to\ n}$ and $g1_{1\ to\ n}$, each pair fulfilling a predefined set of criteria;
d) determining pairing values based on the glucose values $g0_x$ and $g1_x$ of each pair x of the at least n pairs of glucose values and optionally determining one or more statistical values based thereon; and
e) comparing the pairing values or the one or more statistical values to respective one or more threshold values obtained from the memory, wherein an exceedance of or falling below one or more of the respective threshold values indicates a deficiency of the basal insulin rate of the diabetes patient.

In one embodiment the program causing the processor to execute a method further comprises:
f) automatically outputting on a display or electronically sending a message to the patient with information regarding the deficiency in the basal insulin rate of the diabetes patient if an exceedance of or falling below one or more of the respective threshold values is detected in step e).

The method of this disclosure provides for an easy determination of a deficiency (also referred to herein as "inadequacy") in the basal insulin rate of a diabetes patient. To conduct the method of this disclosure the patient does not need to have any knowledge on basal insulin rate testing (in short: basal testing) and does not need to pay attention to basal testing guidelines. The patient does not need to set alarms during the night for conducting tests and frustration of the patient from aborted tests is avoided, because the patient does not even need to be aware that a basal test is run for him. The method can be conducted in an automated manner so that no user interaction with the computer the method is implemented on is required at least for steps c) to e) or c) to f). The method of this disclosure can also be seen as a test, whether a further non-automated basal test should be conducted wherein the patient strictly and consciously follows certain guidelines.

In one embodiment, the method of this disclosure includes advising a patient that his basal insulin rate it too low or too high. The method of this disclosure can also include calculating an insulin therapy recommendation and outputting the recommendation on a display or electronically sending the recommendation to the patient or the medical device, e.g., insulin pump, in which event the processor could automatically adjust the infusion rate of the insulin pump.

The method of this disclosure can be implemented on a diabetes management device. A diabetes management device can be or comprise, e.g., a glucose meter, an insulin pump or a mobile phone. The diabetes management device can receive measured glucose values wherein each glucose value is associated with a measurement timestamp via wired transfer or wirelessly from, e.g., a blood glucose meter (for spot monitoring) or a continuous glucose monitoring device. The diabetes management device can further receive meal and/or bolus event information wherein each of the event information is associated with an event timestamp indicating the respective time and date of a meal and/or bolus event. The information associated with an event timestamp indicating the respective time and date of a meal and/or bolus event can be inputted manually or be received via wired transfer or wirelessly from, e.g., an insulin pump or pen or other device. Data (such as measured glucose values, meal event information, bolus information) can be received realtime or with a time delay. In this disclosure, the term "basal insulin rate" or "basal rate" refers to the insulin delivered by a pump as well as the long lasting insulin injected by a pen.

In step c) of the method of this disclosure, it is determined whether the plurality of glucose values comprises at least n pairs of glucose values $g0_{1\ to\ n}$ and $g1_{1\ to\ n}$, each pair fulfilling a predetermined set of criteria. In one embodiment this means that each of the least n pairs of glucose values in one embodiment fulfills the following criteria: the glucose value $g0_x$ of the pair x fulfills a first predefined set of criteria, the glucose value $g1_x$ of the pair x fulfills a second predefined set of criteria. In one embodiment, in step c) of the method of this disclosure it is determined whether the plurality of glucose values comprises at least 5 (or 7 or 10) pairs of glucose values $g0_{1-5}$ and $g1_{1-5}$ with associated respective measurement timestamps $t0_{1-5}$ and $t1_{1-5}$, each pair fulfilling a predetermined set of criteria, i.e., it is determined whether the plurality of glucose values comprises at least 5 pairs of glucose values ($g0_1$, $g1_1$; $g0_2$, $g1_2$; $g0_3$, $g1_3$; $g0_4$, $g1_4$; $g0_5$, $g1_5$ with associated respective measurement timestamps $t0_1$, $t1_1$; $t0_2$, $t1_2$; $t0_3$, $t1_3$; $t0_4$, $t1_4$; $t0_5$, $t1_5$), each pair ($g0_1$, $g1_1$; $g0_2$, $g1_2$; $g0_3$, $g1_3$; $g0_4$, $g1_4$; $g0_5$, $g1_5$ with associated respective measurement timestamps $t0_1$, $t1_1$; $t0_2$, $t1_2$; $t0_3$, $t1_3$; $t0_4$, $t1_4$; $t0_5$, $t1_5$) fulfilling a predetermined set of criteria.

With the method of this disclosure the patient does not need to measure and collect glucose values specifically for the purpose of conducting a basal insulin test, but the method of this disclosure makes advantageous use of the available data that a diabetes patient usually collects to check whether "by chance" the plurality of collected data contains a sufficient number of suitable data pairs for assessing the basal insulin rate of the patient.

Suitable data pairs can be identified according to predefined criteria obtained from the memory of the system.

In one embodiment of the method of this disclosure, in step c) it is determined whether the plurality of glucose values comprises at least n pairs of glucose values $g0_{1\ to\ n}$ and $g1_{1\ to\ n}$, each pair of glucose values fulfilling at least the following criteria as the predetermined set of criteria:
  the glucose value $g0_x$ of the pair x has a timestamp $t0_x$ in a first predefined time of day range obtained from the memory and the glucose value $g1_x$ of the pair x has a timestamp $t1_x$ within a first predefined temporal period obtained from the memory relative to the timestamp of the glucose value $g0_x$ of the pair x of glucose values;
  no meal and/or bolus event information with an event timestamp between $t0_x$ and $t1_x$ of the pair of glucose values has been received;
  no meal and/or bolus event information with an event timestamp in a second predefined temporal period obtained from the memory relative to $t0_x$ of the glucose value $g0_x$ of the pair x has been received; and
  the glucose value $g0_x$ of the pair x is within a predefined glucose value range obtained from the memory.

For example, it can thus be ensured that the pairs used for assessing the basal insulin rate comprise suitable fasting values and that the patient has no or little fast acting insulin on board when glucose values are considered for determining a deficiency in the basal insulin rate in the method of this disclosure.

In one embodiment, the predetermined set of criteria includes the following requirement:
  the glucose value $g0_x$ of the pair x has a measurement timestamp $t0_x$ between 9 p.m. and 12 a.m. and the glucose value $g1_x$ of the pair x has a measurement timestamp $t1_x$ within 4 to 10 hours after the measurement timestamp $t0_x$ of the glucose value $g0_x$ of the pair x.

This would target basal rate testing during a fasting period overnight.

In one embodiment of this disclosure the predetermined set of criteria includes the following requirement:
  the glucose value $g1_x$ of the pair x has a measurement timestamp within a predefined date range obtained from the memory, which is preferably not more than 30 days from the date of outputting on a display or electronically sending the message to the patient with information regarding the deficiency in the basal insulin rate of the diabetes patient.

Thereby, it can further be ensured that recent data are considered for assessing the basal insulin rate.

In one embodiment of this disclosure the predetermined set of criteria includes the following requirement:
  no measured glucose value with a measurement timestamp between $t0_x$ and $t1_x$ of the pair x of glucose values has been received.

If a measured glucose value with a timestamp between $t0_x$ and $t1_x$ of the pair x of glucose values is received, this may, e.g., be an indicator that something "went wrong" for the patient between $t0_x$ and $t1_x$ or the patient consumed food or injected (bolus) insulin between $t0_x$ and $t1_x$ of the pair x of glucose (potentially without properly entering this as a meal and/or bolus event in his diabetes management device).

In one embodiment of this disclosure the predetermined set of criteria includes the following requirement:
  the glucose value $g0_x$ of the pair x is in a range A, or in a range B being different from A and when range A is considered as the required range, step f) comprises automatically outputting on a display or electronically sending a message with information to the patient that the patient experiences a pattern of high morning glucose values if an exceedance of one or more of the respective threshold values is detected in step e), whereas when range B is considered as the required range, step f) comprises automatically outputting on a display or electronically sending a message with information to the patient that the patient experiences a pattern of low morning glucose values if a falling below one or more of the respective threshold values is detected in step e).

In one embodiment of this disclosure the predetermined set of criteria includes the following requirement:
  the glucose value $g0_x$ of the pair x is in a range of 100-170 mg/dl in which case step f) comprises automatically outputting on a display or electronically sending a message with information to the patient that the patient experiences a pattern of high morning glucose values if an exceedance of one or more of the respective threshold values is detected in step e).
or
  the glucose value $g0_x$ of the pair x is in a range of 80-150 mg/dl, in which case step f) comprises automatically outputting on a display or electronically sending a message with information to the patient that the patient experiences a pattern of low morning glucose values if a falling below one or more of the respective threshold values is detected in step e).

Thereby, it can be particularly ensured that the assessment of the basal rate is conducted based on pairs of glucose values with a glucose value g0 being in-range. Using separate criteria for informing a patient that he experiences a pattern of high or low morning glucose values further allows to provide for basal rate testing for many occasions, but keeps the risk of making determinations that may lead the patient to wrong conclusions low. E.g., using only one allowed range of 100-150 mg/dl as a requirement for valid g0 values would mean that the patients that can be reached by the method is limited (not too many patients go to bed consistently with these perfect values). However, if simply a broader range of 80-170 mg/dl was used and a patient was informed of morning highs, this may lead the patient to the conclusion that injecting more insulin or increasing basal rate of an insulin pump is appropriate. This could cause the patient to drop below 70 mg/dl which is unwanted. Therefore, using separate criteria for g0 to inform the patient of a pattern of high or low morning glucose values is advantageous.

In one embodiment of this disclosure, the predetermined set of criteria includes the following requirement:

no measured glucose value below a predefined hypoglycemia threshold obtained from the memory up to 6 hours before $t0_x$ of the pair x of glucose values is received.

In one embodiment of this disclosure, the predetermined set of criteria includes the following requirement:

not two or more measured glucose values below a predefined hypoglycemia threshold obtained from the memory up to 48 hours before $t0_x$ of the pair x of glucose values is received.

Faulty determinations due to hormone counter-regulation as a consequence of strong hypoglycemia can thus be avoided. The hypoglycemia threshold can, e.g., be defined as 60 mg/dl.

In one embodiment of this disclosure, step d) comprises determining the differences $g1_x-g0_x$ of each of the at least n pairs of glucose values as the pairing values, and preferably automatically determining one or more percentiles as the one or more statistical values of the differences. Step d) can, e.g., comprise automatically determining the $40^{th}$ and $25^{th}$ percentiles as the one or more statistical values of the differences, step e) can comprise automatically comparing the $40^{th}$ percentile to a threshold of 30 mg/dl and the $25^{th}$ percentile to a threshold of −30 mg/dl, and step f) can comprise automatically outputting on a display or electronically sending a message with information to the patient that the patient experiences a pattern of high glucose values if the $40^{th}$ percentile lies above the threshold of 30 mg/dl and the $25^{th}$ percentile lies above the threshold of −30 mg/dl. As another example, step d) can comprise automatically determining the $60^{th}$ and $75^{th}$ percentiles as the one or more statistical values of the differences, step e) can comprise automatically comparing the $60^{th}$ percentile to a threshold of −30 mg/dl and the $75^{th}$ percentile to a threshold of 30 mg/dl, and step f) can comprise automatically outputting on a display or electronically sending a message with information to the patient that the patient experiences a pattern of low glucose values if the $60^{th}$ percentile lies below the threshold of −30 mg/dl and the $75^{th}$ percentile lies below the threshold of 30 mg/dl.

More particularly, in one embodiment of this disclosure n is 5 and the following rule is used for informing a patient of a pattern of high or low morning glucose values:

|  | MORNING_HIGHS | MORNING_LOWS |
|---|---|---|
| rule | morning_highs = P40 > 30 mg/dl and P25 > −30 mg/dl | morning_lows = P60 < −30 mg/dl and P75 < 30 mg/dl |

In other words, for this embodiment there would need to be at least 5 "valid" pairs of glucose values. From those, the indicated percentiles (Pxx) of the difference (g1−g0) are calculated, for each pair, which serve for classification. A percentile is a measure used in statistics indicating the value below which a given percentage of observations in a group of observations fall. For example, the $40^{th}$ percentile (P40) is the value (or score) below which 40% of the observations may be found.

The determination whether the plurality of glucose values comprises at least n pairs of glucose values $g0_{1\ to\ n}$ and $g1_{1\ to\ n}$, each pair of glucose values fulfilling a predetermined set of criteria can be conducted automatically at a predetermined timepoint. Alternatively, the data processing system can receive a request for conducting step c) (and further steps d)-f)).

In one embodiment, the method of this disclosure comprises determining whether a new pair of glucose values g0 and g1 is received which fulfills the predetermined set of criteria and wherein step c) is conducted automatically if a new pair of glucose values g0 and $g_1$ is detected.

In the method of this disclosure, meal and/or bolus event information, wherein each of the event information is associated with an event timestamp indicating the respective time and date of a meal and/or bolus event, may be received. The information associated with an event timestamp indicating the respective time and date of a meal and/or bolus event can be, e.g., inputted manually in a diabetes management device or the information can be received via wired transfer or wirelessly from, e.g., a pump or pen or other device. In one embodiment of this disclosure information regarding a deficiency in the basal insulin rate of the diabetes patient is automatically outputted on a display or a message is electronically sent to the patient only if at least 3 meal and/or bolus event information is received, and/or at least 3 measured glucose values have been received per day on a predefined number of days within a predefined date range.

This can ensure that the patient usually properly logs meal and/or bolus event information and measures glucose values frequently which increases the reliability of the determination of deficiencies in the basal rate.

The various embodiments referred to above with regard to a method may apply to the system accordingly.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
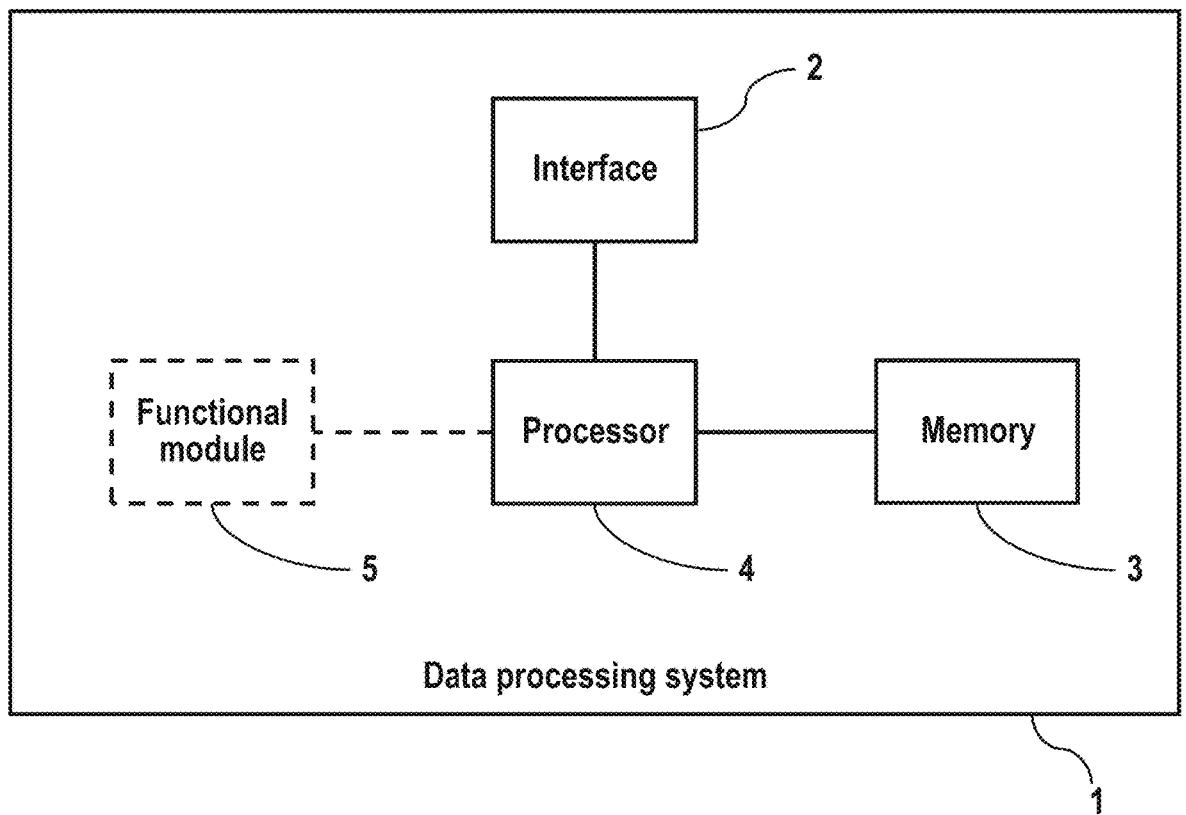
FIG. 1 a schematic representation of a data processing device.

FIG. 1 shows schematic representation of a data processing device 1 (also referred to herein in various embodiments as a "data processing system" or "system") for determining a deficiency in the basal insulin rate of a diabetes patient. The device 1 generally comprises a human machine interface 2, a memory 3 for storing machine-readable instructions, and a processor 4 connected to the human machine interface 2 and the memory 3. The device may comprise one or more functional modules or elements 5, for example, an interface for wireless data transmission, or an insulin pump.

Machine-readable instructions are provided that are executed for determining a deficiency in the basal insulin rate of a diabetes patient. Various embodiments of the system and methods for determining a deficiency in the basal insulin rate will be described in more detail herein.

The processors 4 may be a controller, an integrated circuit, a microchip, a computer, or any other computing device capable of executing machine-readable instructions. The memory 3 may be RAM, ROM, a flash memory, a hard drive, or any device capable of storing machine-readable instructions.

The device 1 may be provided in any kind of data system configured for electronic data processing.

In the embodiments described herein, the device 1 may, for example, be implemented in a glucose meter, a medication (e.g., insulin) delivery device, a mobile phone, a portable digital assistant (PDA), a mobile computing device such as a laptop, a tablet, or a smart phone, a desktop computer, or a server, e.g., via a cloud or web based technologies. It is to be appreciated that in at least one embodiment of the mobile computing device which is useful with one or more embodiments disclosed herein, such a device may include a touch screen and the computing ability to run computational algorithms and/or processes, such as those disclosed herein, and applications, such as an electronic mail program, a calendar program for providing a calendar, as well as provide cellular, wireless, and/or wired connectivity and one or more of the functions of a glucose meter, a digital media player, a digital camera, a video camera, a GPS navigation unit, and a web browser that can access and properly display web pages. Accordingly, the system may include a plurality of components. The systems may also utilize a distributed computing arrangement to perform any of the machine-readable instructions described herein.

In one embodiment, the device 1 may be implemented in a personal computer or a mobile device, e.g., a smart phone. In this and other embodiments the plurality of measured glucose values are transferred from the meter to the smart phone by wireless or wired data transfer. Meal and/or bolus events may be entered into the smart phone directly or be transferred from other devices to the smart phone by wireless or wired data transfer.

The device further comprises the human machine interface 2 communicatively coupled to the processor 1 for presenting graphical, textual and/or auditory information. The human machine interface 2 may include an electronic display such as, for example, a liquid crystal display, thin film transistor display, light emitting diode display, a touch screen, or any other device capable of transforming signals from a processor into an optical output, or a mechanical output, such as, for example, a speaker, a printer for displaying information on media, and the like.

Embodiments of the present disclosure also comprise machine-readable instructions that includes logic or an algorithm written in a programming language such as, e.g., machine language that may be directly executed by the processor, or assembly language, object oriented programming (OOP), scripting languages, microcode, etc., that may be compiled or assembled into machine-readable instructions and stored on a machine-readable medium. Alternatively, the logic or algorithm may be written in a hardware description language (HDL), such as implemented via either a field-programmable gate array (FPGA) configuration or an application-specific integrated circuit (ASIC), and their equivalents. Accordingly, the machine-readable instructions may be implemented in any conventional computer programming language, as pre-programmed hardware elements, or as a combination of hardware and software components. Moreover, machine-readable instructions can be distributed over various components that are communicatively coupled such as, for example, via wires, via a wide area network, via a local area network, via a personal area network, and the like. Thus, any components of the system can transmit signal over the Internet or World Wide Web.

According to the embodiments described herein, the processor 4 of the device 1 can execute machine-readable instructions for determining a deficiency in the basal insulin rate of a diabetes patient, and if the processor is in communication with an insulin pump of the system, the basal rate of the pump can be automatically adjusted by the processor in response to the deficiency.

Figure 2:
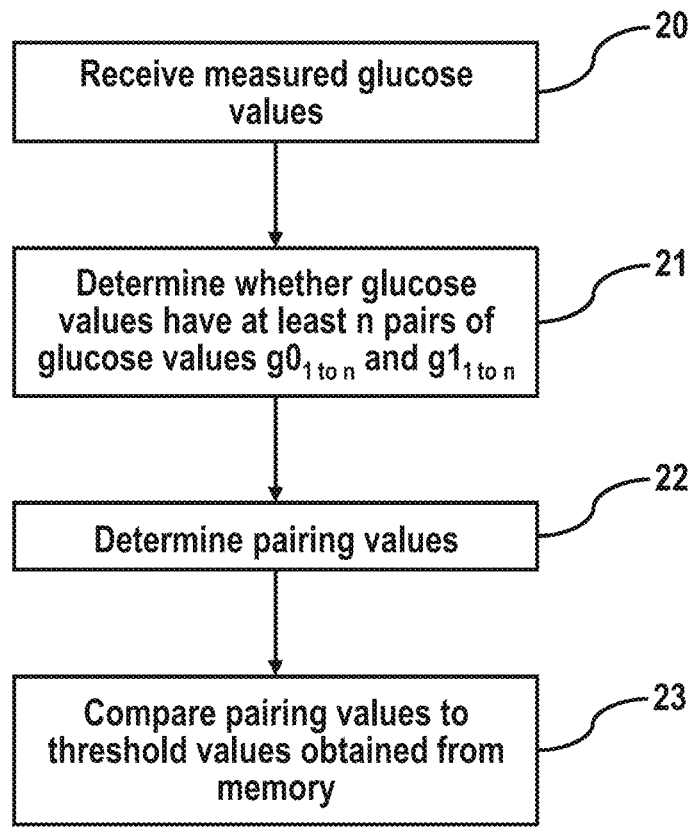
FIG. 2 a schematic representation of a process of operating the device.

FIG. 2 shows a schematic representation of a block diagram with regard to a method for determining a deficiency in the basal insulin rate of a diabetes patient.

In step 20, a plurality of measured glucose values, wherein each glucose value is associated with a measurement timestamp indicating the respective time and date of measurement, is received in the data processing device 1. The plurality of measured glucose values may be received via an interface for wireless data transmission. Optionally, step 20 also includes receiving meal and/or bolus event information wherein each of the event information is associated with an event timestamp indicating the respective time and date of a meal and/or bolus event in the data processing device 1.

In step 21, it is determined whether the plurality of glucose values comprises at least n pairs of glucose values $g0_{1\,to\,n}$ and $g1_{1\,to\,n}$, each pair of glucose values fulfilling a predefined set of criteria.

In step 22, pairing values are determined based on the glucose values $g0_x$ and $g1_x$ of each pair x of the at least n pairs of glucose values. Optionally, one or more statistical values based thereon are also determined. For example, the differences $g1_x - g0_x$ of each pair x of the at least n pairs of glucose values are determined as the pairing values, and one or more percentiles as the one or more statistical values of the differences are determined.

In step 23, the pairing values or the one or more statistical values are compared to respective one or more threshold values obtained from the memory, wherein an exceedance of or falling below one or more of the respective threshold values indicates a deficiency of the basal insulin rate of the diabetes patient. Information regarding the deficiency in the basal insulin rate of the diabetes patient if an exceedance of or falling below one or more of the respective threshold values is detected may be automatically outputted on a display device or a message is electronically sent via the output device to the patient with information regarding the deficiency in the basal insulin rate of the diabetes patient.

Figure 3:
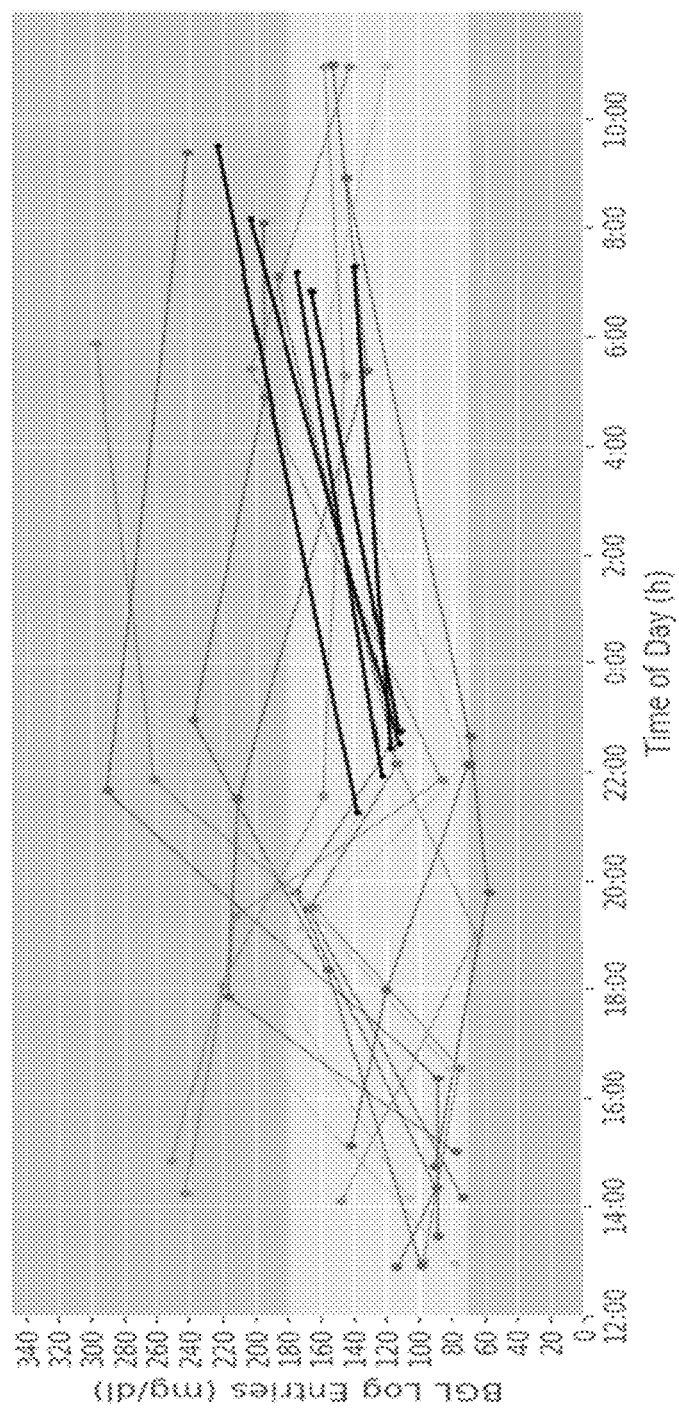
FIG. 3 a schematic representation of received glucose data of a patient and determination of a night basal pattern.

FIG. 3 shows a schematic representation of a received plurality of measured glucose values of a patient based on spot glucose monitoring data over several 24 hour time periods. Event/bolus information is also received for the patient (not shown in FIG. 3). The glucose data are scaled according to the time abscissa extending over 24 h. As an example, the patient's data of the last 30 days is reviewed for finding pairs of glucose values fulfilling a predefined set of criteria (inclusion and exclusion criteria). The predefined set of criteria are set to increase the likelihood that the findings made are indeed a result of a basal problem. Matched pairs fulfilling the predefined set of criteria are highlighted in FIG. 3. In this case, multiple pairs of glucose values have been found, which fulfill the predefined set of criteria, that show a nightly glucose increase, whereas for this patient no contradicting data points have been found. An issue with basal insulin regimen is indicated in this case. This would trigger information to be sent to the patient, highlighting the trend and potentially also indicating reasons and next steps.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A system for determining a deficiency in a basal insulin infusion rate for a diabetic patient, comprising:
    a diabetes management device;
    a processor,
    a display; and
    a memory storing a program which causes the processor to execute the following steps:
      a) receiving a plurality of measured glucose values, wherein each glucose value is associated with a measurement timestamp indicating a respective time and date of measurement; wherein step a) further comprises wirelessly or via wired transfer receiving the plurality of measured glucose values on the diabetes management device from a blood glucose meter for spot monitoring,
      b) receiving, by the processor, meal and/or bolus event information wherein each of the meal and/or bolus event information is associated with an event timestamp indicating a respective time and date of a meal and/or bolus event,
      c) determining whether the plurality of measured glucose values comprises at least n pairs of glucose values $g0_{1\,to\,n}$ and $g1_{1\,to\,n}$, wherein n is at least 5, each pair x of glucose values fulfilling a predefined set of criteria obtained from the memory, wherein the predefined set of criteria includes the following requirements:
        there are no measured glucose values with measurement timestamps between $t0_x$ and $t1_x$ of the pair x of glucose values,
        a glucose value $g0_x$ of the pair x has the measurement timestamp $t0_x$ in a first predefined time of day range and a glucose value $g1_x$ has the measurement timestamp $t1_x$ within a first predefined temporal period relative to the measurement time stamp $t0_x$,
        no meal and/or bolus event information has its event timestamp between $t0_x$ and $t1_x$,
        no meal and/or bolus event information has its event timestamp in a second predefined temporal period relative to $t0_x$, and
        the glucose value $g0_x$ is within a predefined glucose value range;
      d) determining pairing values based on the glucose values $g0_x$ and $g1_x$ of each pair x of the at least n pairs of glucose values, wherein the pairing value comprises the difference g1x-g0x of each of the at least n pairs of glucose values, and determining one or more statistical values based thereon; and
      e) comparing the one or more statistical values to respective threshold values obtained from the memory, wherein exceeding or falling below one or more respective threshold values indicates a deficiency of the basal insulin infusion rate of the diabetic patient.

2. The system of claim 1, further comprising a pump having an infusion rate and configured for communication with the processor and wherein the processor is further configured to adjust the infusion rate of the pump.

3. The system according to claim 1, wherein the program causes the processor to execute the step of:
    f) automatically outputting on the display or electronically sending a message to the diabetic patient with information regarding the deficiency in the basal insulin infusion rate of the diabetic patient if exceeding or falling below one or more of the respective threshold values is detected in step e).

4. The system according to claim 1, wherein the predefined set of criteria includes the following requirement:
    the measurement timestamp $t0_x$ of glucose value $g0_x$ of the pair x is between 9 pm and 12 am and the measurement timestamp $t1_x$ of glucose value $g1_x$ of the pair x is within 4 to 10 hours after the measurement timestamp $t0_x$ of the glucose value $g0_x$ of the pair x.

5. The system according to claim 3, wherein the predefined set of criteria includes the following requirement:
    the glucose value $g1_x$ of the pair x has the measurement timestamp $t1_x$ within a predefined date range obtained from the memory, wherein the predefined date range is not more than 30 days from the date of outputting on the display or electronically sending the message to the diabetic patient with information regarding the deficiency in the basal insulin infusion rate of the diabetic patient.

6. The system according to claim 3, wherein, when the glucose value $g0_x$ of the pair x is in a range of 100-170 mg/dl, step f) comprises automatically outputting on the display or electronically sending a message to the diabetic patient that the diabetic patient experiences a pattern of high morning glucose values if an exceedance of one or more of the respective threshold values is detected in step e); or when the glucose value $g0_x$ of the pair x is in a range of 80-150 mg/dl, step f) comprises automatically outputting on the display or electronically sending a message with information to the diabetic patient that the diabetic patient experiences a pattern of low morning glucose values if a falling below one or more of the respective threshold values is detected in step e).

7. The system according to claim 1, wherein the predefined set of criteria includes the following requirement:

no measured glucose value is below a predefined hypoglycemia threshold obtained from the memory within 6 hours before $t0_x$ of the pair x of glucose values is received.

8. The system according to claim 1, wherein the predefined set of criteria includes the following requirement:

less than two measured glucose values are below a predefined hypoglycemia threshold obtained from the memory within 48 hours before $t0_x$ of the pair x of glucose values is received.

9. The system according to claim 3, wherein step d) comprises automatically determining one or more percentiles as the one or more statistical values of the differences.

10. The system according to claim 9, wherein:

step d) comprises automatically determining the $40^{th}$ and $25^{th}$ percentiles as the one or more statistical values of the differences;

step e) comprises automatically comparing the $40^{th}$ percentile to a threshold of 30 mg/dl and the $25^{th}$ percentile to a threshold of −30 mg/dl; and step f) comprises automatically outputting on the display or electronically sending a message with information to the diabetic patient that the diabetic patient experiences a pattern of high glucose values if the $40^{th}$ percentile lies above the threshold of 30 mg/dl and the $25^{th}$ percentile lies above the threshold of −30 mg/dl.

11. The system according to claim 9, wherein:

step d) comprises automatically determining the 60th and 75th percentiles as the one or more statistical values of the differences;

step e) comprises automatically comparing the 60th percentile to a threshold of −30 mg/dl and the 75th percentile to a threshold of 30 mg/dl; and step f) comprises automatically outputting on the display or electronically sending a message with information to the diabetic patient that the diabetic patient experiences a pattern of low glucose values if the 60th percentile lies below the threshold of −30 mg/dl and the 75th percentile lies below the threshold of 30 m g/dl.

* * * * *